United States Patent [19]

Rehn et al.

[11] Patent Number: 4,829,956
[45] Date of Patent: May 16, 1989

[54] METHOD AND APPARATUS FOR DETECTING DISCRETE LEVELS OF DETONATION IN AN INTERNAL COMBUSTION ENGINE

[75] Inventors: Bryce H. Rehn, Edwards; Ronald J. Penick; Daniel W. Esters, both of Peoria; Harold A. Baker, East Peoria, all of Ill.

[73] Assignee: Caterpillar Inc., Peoria, Ill.

[21] Appl. No.: 115,285

[22] Filed: Nov. 2, 1987

[51] Int. Cl.$^4$ .................................................. F02P 5/14
[52] U.S. Cl. ..................... 123/198 DB; 123/198 DC; 123/425
[58] Field of Search .... 123/198 D, 198 DB, 198 DC, 123/425; 73/35

[56] References Cited

U.S. PATENT DOCUMENTS

| | | | |
|---|---|---|---|
| 3,822,583 | 7/1974 | Keller et al. | 73/35 |
| 4,002,155 | 1/1977 | Harned et al. | 123/425 |
| 4,012,942 | 3/1977 | Harned | 123/425 |
| 4,133,475 | 1/1979 | Harned et al. | 123/425 |
| 4,300,503 | 11/1981 | Deleris et al. | 123/425 |
| 4,337,642 | 7/1982 | Yoshida | 123/425 X |
| 4,364,260 | 12/1982 | Chen | 73/35 |
| 4,384,473 | 5/1983 | Brandt | 73/35 |
| 4,424,706 | 1/1984 | Ola | 73/35 |
| 4,606,315 | 8/1986 | Tobinaga et al. | 123/198 DC |

Primary Examiner—Tony M. Argenbright
Assistant Examiner—Eric R. Carlberg
Attorney, Agent, or Firm—Terry D. Morgan; Robert E. Muir

[57] ABSTRACT

A method detects the magnitude of knock in an internal combustion engine. Each knock is quantified into a discrete level which gives an indication of the operating condition of the engine. The discrete level signals provide information helpful during engine calibration and engine monitoring. After a predetermined number of level signals indicative of preselected magnitudes of knock are received, an engine shutdown signal is delivered which ceases engine operation.

13 Claims, 4 Drawing Sheets

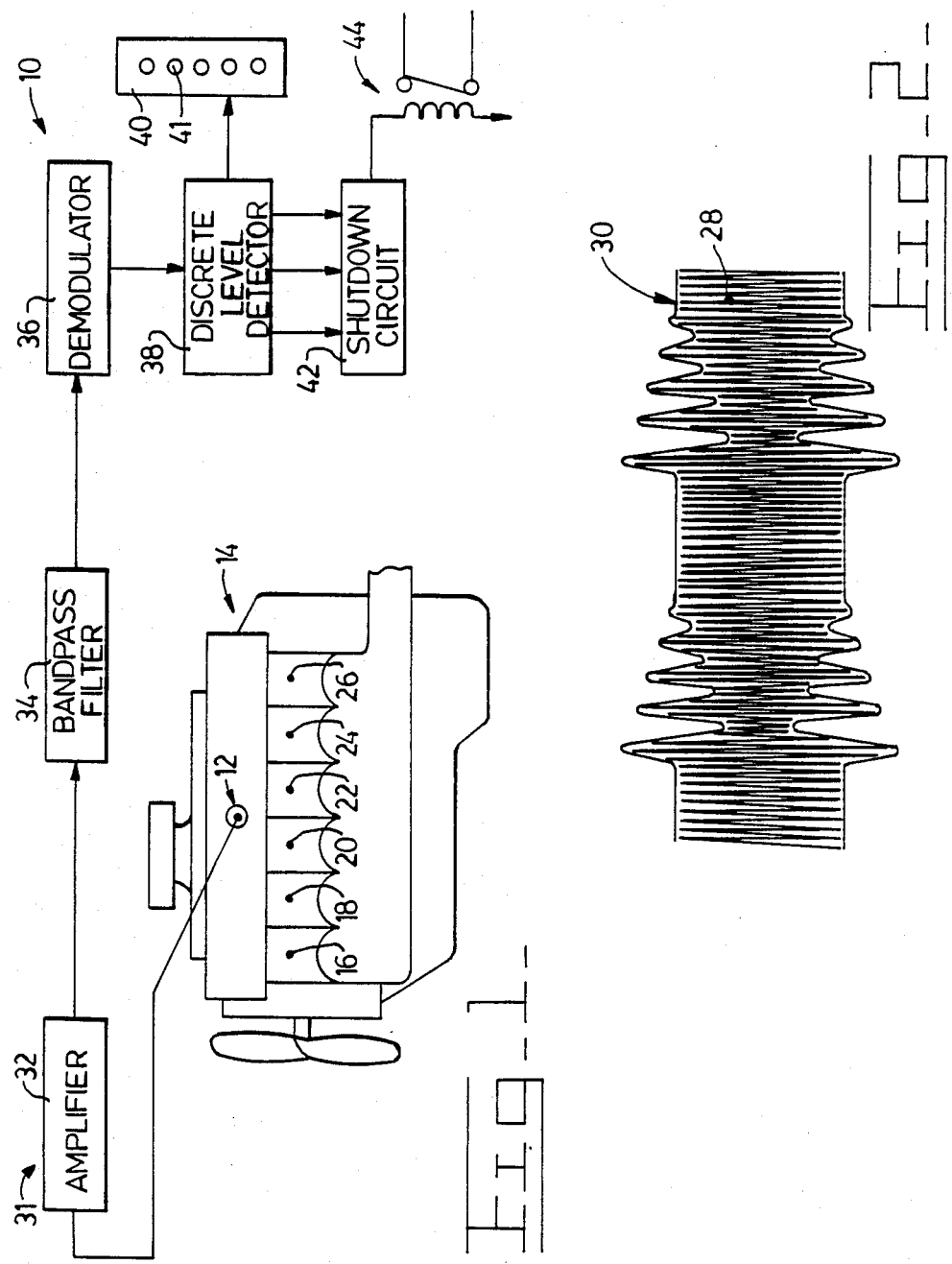

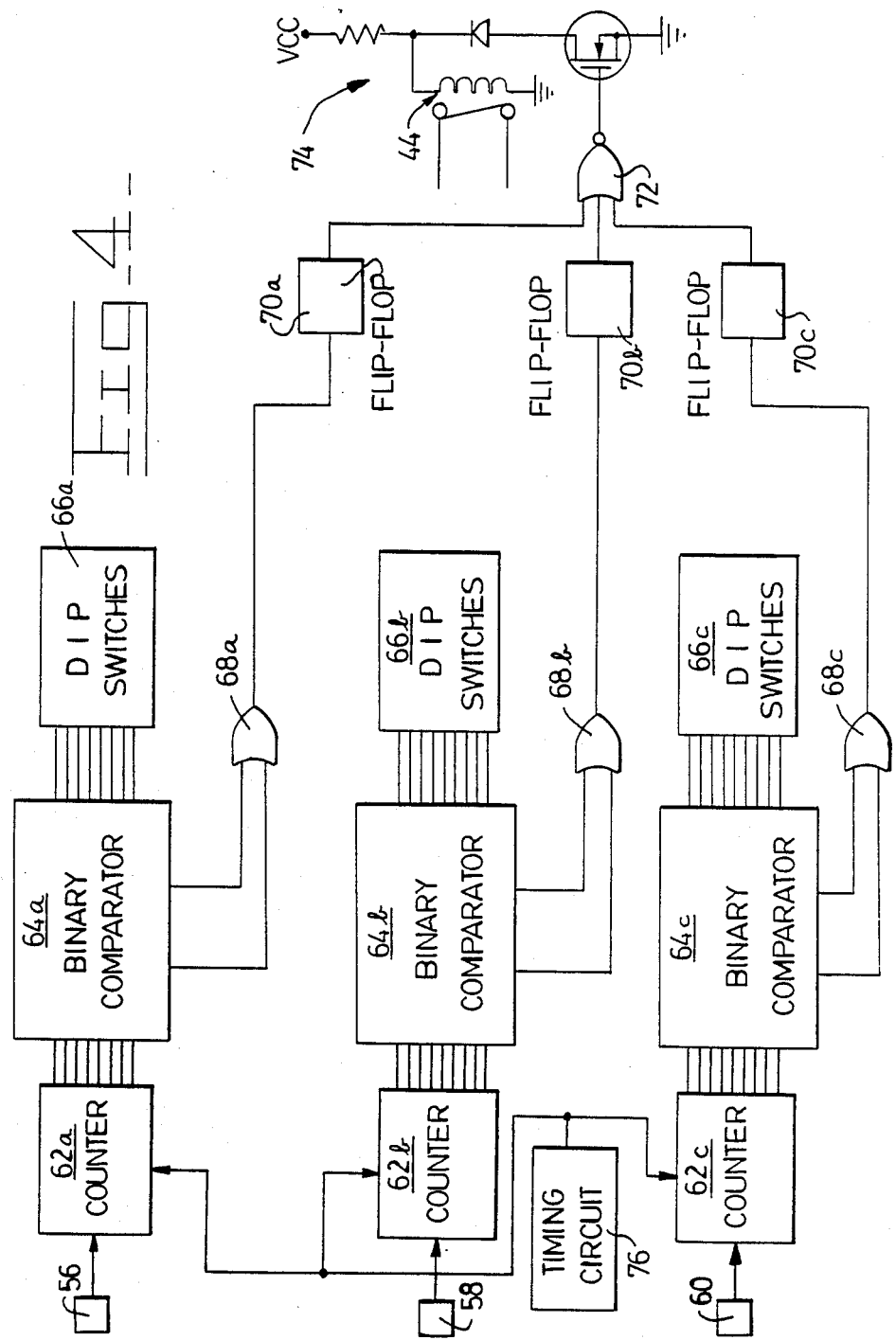
FIG_4

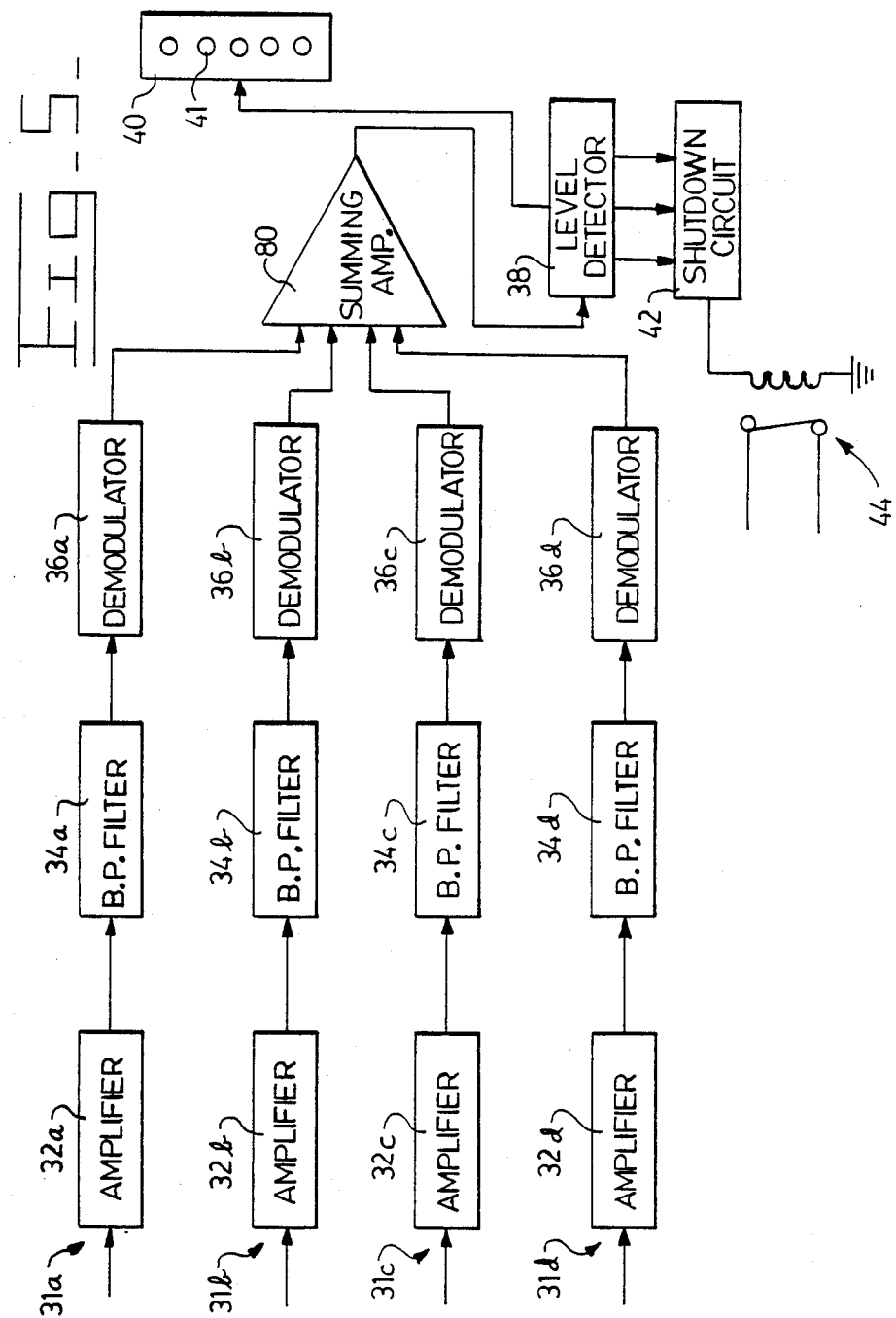

METHOD AND APPARATUS FOR DETECTING DISCRETE LEVELS OF DETONATION IN AN INTERNAL COMBUSTION ENGINE

TECHNICAL FIELD

This invention relates generally to the measuring of knock in an internal combustion engine and more particularly to detecting discrete levels of knock in an internal combustion engine.

BACKGROUND ART

Explosive-detonation and autoignition of end gas in a combustion chamber produce a metallic sound, commonly referred to as knock. Knock is caused by improper ignition of fuel in an internal combustion engine. Improper ignition results in decreased engine performance and increased emissions. Knock, furthermore, generates acoustic vibrations which propagate throughout the engine structure, and possibly other adjoining structures. These vibrations, coupled with a rapid rate of pressure rise in the combustion chamber, may promote accelerated wearing of engine components. Wear may be even faster for engines operating with natural gas, due to a higher rate of pressure rise in the combustion chamber as compared with gasoline powered engines.

Prior systems provide means for detecting knock and controlling selected engine operating parameters to reduce the knock to an acceptable level. Recently these efforts have been directed to sensing knock induced vibrations by monitoring one or more characteristic frequencies corresponding to the acoustic cavity resonance modes of the combustion chamber. These characteristic frequencies generally act as carrier waves and modulate the knock vibrations. When demodulated, the magnitude of the envelope of the carrier wave denotes the magnitude of the knock. This information is typically used to retard the spark advance, which reduces knock.

Air/fuel ratio controls and spark retarders effectively reduce knock to acceptable levels. However, these controls and their sensors can malfunction. Known oxygen sensors, in particular, have relatively short lives of 1000 to 2000 hours. In automotive applications this life expectancy is acceptable. However, work engines may be required to perform in excess of 10,000 hours. Should a sensor or control fail, the engine would be susceptible to possibly damaging knock.

The present invention is directed to overcoming one or more of the problems as set forth above.

DISCLOSURE OF THE INVENTION

In one aspect of the invention a method is provided for detecting the magnitude of knock in an internal combustion engine having at least one combustion chamber. A signal responsive to a cavity resonance frequency of at least one combustion chamber is transmitted. The transmitted signal is processed to produce a knock signal having a magnitude responsive to the magnitude of knock. The magnitude of the knock signal is compared to a first preselected reference and to a second preselected reference. A level signal indicative of the magnitude of the knock signal is delivered in response to a portion of the knock signal exceeding at least one of the preselected references.

Engines used in production environments typically have lives of over 10,000 hours. Standard air/fuel ratio controls and spark retarders use components with much shorter lives. Should a component in one of these controls fail, the engine could become prey to potentially damaging explosive-detonation, or knock. A backup control which senses knock levels can be used to shutoff an engine which for some reason, such as a failed air/fuel ratio control, has developed excessive knock.

The method provides a level signal indicative of discrete levels of knock. This signal can be sent to an LED display, for instance, which has a number of LEDs, each one being representative of a discrete level of knock. This display is useful to an operator when calibrating an engine. Moreover, the level signal can be compared to preselected references. After a predetermined number of level signals exceeding a certain preselected reference, a signal may be delivered to trigger an engine shutoff circuit, for instance.

BRIEF DESCRIPTION OF THE DRAWINGS

FIG. 1 is a block diagram of an embodiment of the invention;

FIG. 2 illustrates a knock signal and a carrier wave;

FIG. 4 is a circuit diagram of a preferred embodiment of the engine shutdown circuit; and FIG. 5 is a block diagram of an alternate embodiment of the inventions.

BEST MODE FOR CARRYING OUT THE INVENTION

Figure 3:
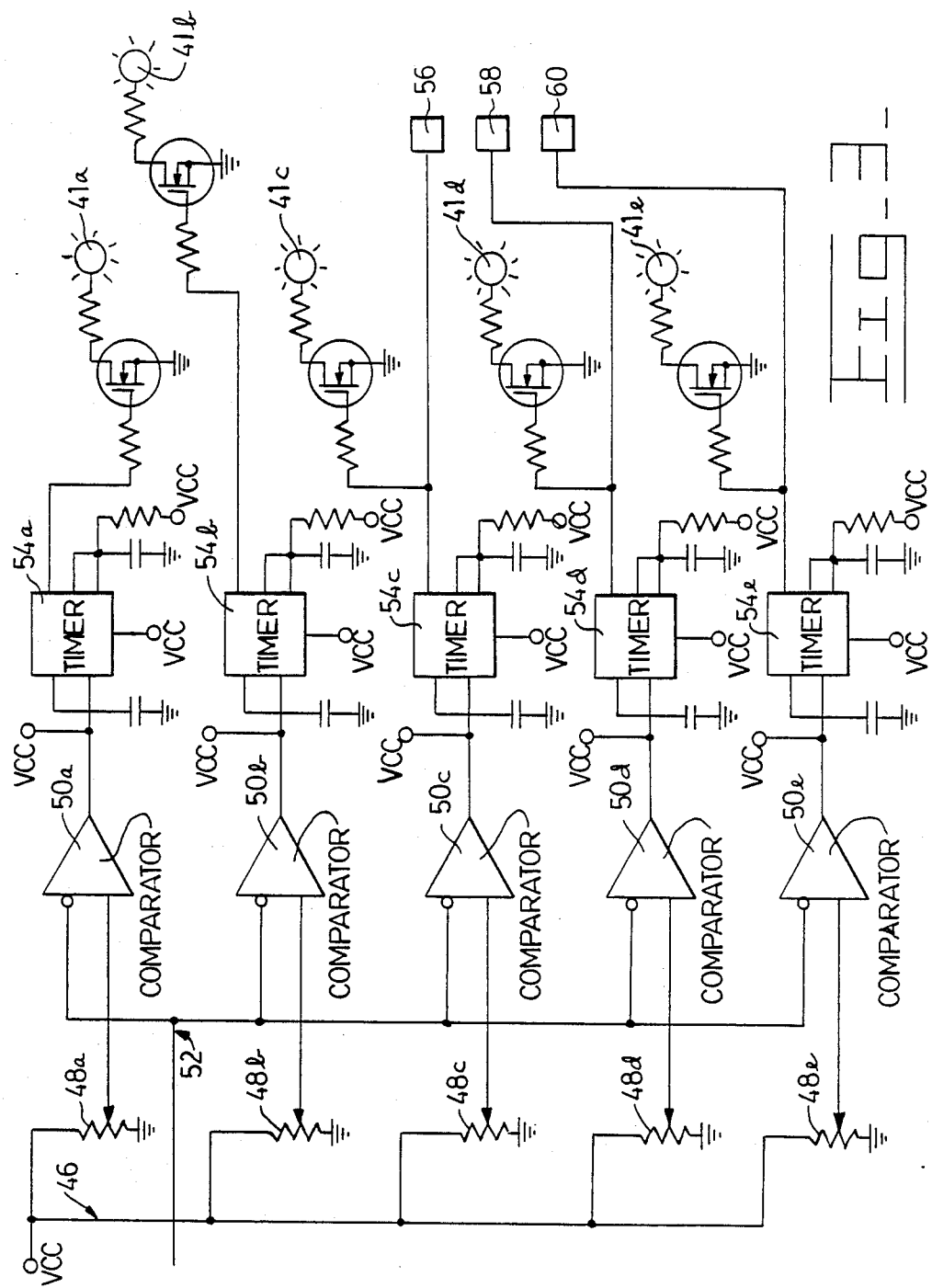
FIG. 3 is a circuit diagram of a preferred embodiment of the discrete level detector.

The drawings show a preferred embodiment of the present apparatus 10. The apparatus 10 embodies a method for detecting the magnitude of knock in an internal combustion engine. Knock is commonly referred to as an explosive detonation or autoignition of end gas in a combustion chamber which produces a metallic sound. The method includes transmitting a signal responsive to a cavity resonance frequency of a combustion chamber of an engine 14. The transmitted signal is processed to produce a knock signal having a magnitude responsive to the magnitude of knock in the engine. The knock signal is compared to a first and second preselected reference, and a level signal indicative of the magnitude of the knock signal is delivered in response to a portion of the knock signal exceeding at least one preselected reference. This method is set forth generally with respect to FIGS. 1, 2, and 5, and more particularly with respect to FIGS. 3 and 4.

FIG. 1 shows a vibration sensor, such as an accelerometer 12, mounted on an engine 14. The engine 14 is preferably an internal combustion engine having at least one combustion chamber 16,18,20,22,24,26. The accelerometer 12 is of a kind commercially available and is tuned to sense vibrations in a range about a cavity resonance frequency of at least one combustion chamber.

Those skilled in the art recognize that cavities resonate at certain frequencies. Knock produces acoustic vibrations in the combustion chamber which excite the engine structure at the frequencies of cavity resonances. The resonances in a combustion chamber are determined by the following equation.

$f = c/B$ Equation 1

$f$ is frequency in hertz;
$c$ is the speed of sound;

is a non-dimensional number; and

B is the combustion chamber diameter.

This equation shows that the cavity resonant frequency f varies directly with the speed of sound and inversely with the diameter B. The speed of sound changes with the temperature of the combustion chamber, which rises as engine load increases. Therefore, the cavity resonant frequency f changes during engine operation. Preferably the first mode cavity resonance frequency is sensed to obtain an indication of engine knock. Therefore, the accelerometer 12 senses vibrations corresponding to a cavity resonance frequency f, including resonance frequency fluctuations during engine operation.

FIG. 2 shows a typical knock induced signal The carrier wave 28 oscillates at the cavity resonance frequency f. The envelope 30 of the carrier wave 28 varies in amplitude, and contains information concerning engine knock. The accelerometer 12 transmits this type of signal to a channel 31, which includes an amplifier 32, a bandpass filter 34, and a demodulator 36, all shown in FIG. 1. The amplifier 32, the bandpass filter 34, and the demodualtor 36 are all of known design and function to those skilled in the art. Accordingly the detailed circuitry of these components is not discussed herein. The amplifier 32 passes an amplified signal to a bandpass filter 34. The bandpass filter 34 filters the amplified signal, and passes only signals having frequencies within a range about the chosen mode of the cavity resonance frequency f. Typically, engine experiments determine the range of fluctuation of a cavity resonance frequency during the operation cycle of the engine. For instance, the first cavity resonance frequency for a large engine may be 4K Hz using equation 1. As operating temperatures and loads vary, the cavity resonance frequency may vacillate from 2.5K Hz to 5.5K Hz. Therefore, the bandpass filter 34 should pass a frequency band from 2.5K Hz to 5.5K Hz to insure knock detection throughout the engine's operating cycle.

The filtered signal is passed to a demodulator 36, which detects the envelope 30 of the carrier wave 28. The envelope 30 varies in amplitude in response to knock, hence the waveform of the envelope 30 is an accurate indicator of the magnitude of engine knock. The envelope 30 is a knock signal which passes to a discrete level detector 38.

The discrete level detector 38 detects discrete levels of knock in response to the magnitude of the knock signal exceeding a first and second preselected reference. A level signal is delivered in response to a portion of the knock signal exceeding at least one of the preselected references. The level signal indicates a discrete level of engine knock. For example, when the knock signal is compared to two preselected references, three discrete knock levels are detected. If the first preselected reference is less than the second preselected reference, then a knock signal less than the first preselected reference represents a light level knock signal. If the knock signal is greater then the first preselected reference and less than the second preselected reference, then the knock signal represents a medium level knock signal. Likewise, if the knock signal is greater than both the first and second preselected references, then it represents a heavy level knock signal.

The level signals pass to a display 40. Preferably the display 40 has a plurality of light emitting diodes 41 (LEDs), each one being responsive to a respective discrete level signal. For instance, if the level signal indicates a medium level knock, an LED on the display responds to this signal and illuminates.

A shutdown circuit 42 also receives the level signals. The shutdown circuit 42 counts the number of portions of the knock signal which exceed the first preselected reference, add the number of portions of the knock signal which exceed the second preselected reference. This procedure preferably involves counting the number of level signals which are responsive to medium and heavy knock. When a first predetermined number of medium level signals are received or when a second predetermined number of heavy level signals are received, an engine shutdown signal is delivered. The engine shutdown signal is preferably received by a fuel shutoff relay 44, which when energized causes fuel delivery to the engine to cease. In addition, a more accurate indication of the amount of knock experienced by the engine is accomplished by delivering an engine shutdown signal in response to receiving a first predetermined number of medium level signals in a first predetermined amount of time, or a second predetermined number of heavy level signals in a second predetermined amount of time. For instance, if ten heavy level knocks are experienced in one minute, or if thirty medium level knocks are experienced in one minute, then an engine shutdown signal is delivered.

Referring now to FIG. 3, an illustration of a discrete level detector 38 is shown having capabilities of making five comparisons and rendering six discrete levels of knock. A reference voltage is provided on a line 46. Five potentiometers 48A,48B,48C,48D,48E act as voltage dividers by reducing the reference voltage to respective first, second, third, fourth, and fifth preselected reference voltages. First, second, third, fourth, and fifth comparators 50A,50B,50C,50D,50E receive the respective preselected reference voltages from the potentiometers 48A,48B,48C,48D,48E. The demodulator 36 outputs a knock signal received on a line 52 of the discrete level detector 38. The knock signal is received by the other input of the comparators 50A,50B,50C,50D,50E. The comparators 50A,50B,50C,50D,50E compare the magnitude of the knock signal to the magnitude of the respective preselected reference voltages, and deliver a level signal indicative of the magnitude of the knock signal in response to a portion of the knock signal exceeding at least one of the preselected reference voltages. As is known in the art, a comparator typically outputs a 'high' logical output signal in response to a portion of an input signal exceeding the input reference voltage. In this instance, the output of each comparator represents a discrete level of knock. This circuit shows five comparisons with five preselected references, as contrasted with two comparisons with two preselected references as disclosed earlier. Obviously, a greater or fewer number of comparisons may be made without departing from the scope of the invention, depending upon the number of discrete levels of knock one wishes to detect.

The outputs of the comparators 50A,50B,50C,50D,50E trigger respective first, second, third, fourth, and fifth timers 54A,54B,54C,54D,54E. Tee timers are of a type known in the art and available, for instance, from National Semiconductor Corporation, 2900 Semiconductor Dr., Santa Clara, Calif. U.S.A. as part number LM555. The timers 54A,54B,54C,54D,54E are used here to insert a time delay in the pulses received from the comparators. The timers 54A,54B,54C,54D,54E output signals via respective transistor networks 55A,55B,55C,55D,55E to respective light emitting diodes 57A,57B,57C,57D,57E on the display 40. The time delay imposed by the timers facilitates resolution by the human eye of the separate signals emitted from the light emitting diodes. The third, fourth, and fifth timers 54C,54D,54E also output level signals to the shutdown circuit 42 via the lines 56,58,60, respectively. As shown, these signals denote light, medium, and heavy knock levels.

Referring now to FIG. 4, an illustration of the shutdown circuit 42 is shown. The shutdown circuit 42 counts the number of each kind of level signal and outputs an engine shutdown signal in response to a count exceeding a respective predetermined number. Advantageously, this function is performed as described in relation to FIG. 4, however other apparatus may perform this function without departing from the scope of the invention. The shutdown circuit 42 preferably receives light, medium, and heavy knock level signals on the lines 56,58,60. First, second, and third binary counters 62A,62B,62C receive the light, medium, and heavy level knock signals respectively. The rising edge of each level signal increments the respective counters 2A,62B,62C by one. The counters shown are 8-bit counters. The output of such counters is an 8-bit binary digital signal, although other signal formats such as binary coded decimal can also be used. First, second, and third binary comparators 64A,64B,64C receive the output from the counters 62A,62B,62C. The binary comparators 64A,64B,64C also receive an 8-bit binary signal from respective DIP switches 6A,66B,66C. The DIP switches are configured to provide a preselected binary number that the binary comparators use to compare with the signals from the counters. The binary comparators have three output ports: "greater than", "equal to", and "less than". As each condition is true, the corresponding output port changes from a 'low' logic signal to a 'high' logic signal. For example, when the count from a binary counter is less than the predetermined count provided by the associated DIP switch, the "less than" port of the binary comparator delivers a 'high' logic signal and the other two ports deliver 'low' logic signals. More important is the condition when the input from a binary counter is greater than or equal to the input from the respective DIP switch. To acheive this function first, second, and third "OR" gates 68A,68B,68C receive the "greater than" port and the "equal to" port outputs from the respective binary comparators 64A,64B,64C. First, second, and third flip flops 70A,70B,70C receive the output from their respective "OR" gate 68A,68B,68C. When the signal from an "OR" gate 68A,68B,68C switches from a 'low' logic level to a 'high' logic level, i.e. when the number of level signals received by an associated counter equal or exceed the preselected number, the associated flip flop sets and delivers a 'high' logic level signal. A fourth "OR" gate 72 receives signals from the three flip flops 70A,70B,70C. When one or more of the first, second, and third flip flops sets, the "OR" gate 72 outputs an engine shutdown signal. The engine shutdown signal causes a power circuit 74 to energize the fuel shutoff relay 44, thus terminating fuel flow to the engine.

Additionally, a timing circuit 76 produces logic signals having a first, second, and third predetermined frequency. The timing circuit 76 delivers these signals to the reset ports of the first, second, and third binary counters 62A,62B,62C, respectively. Upon receipt of a 'high' logic signal from the timing circuit 76, a binary counter 62A,62B,62C resets to a count of zero. Using this method, the number of level signals must reach the predetermined number before the counters reset. Therefore, an engine shutdown signal is delivered when a predetermined number of knock signals are received within a predetermined amount of time.

FIG. 5 shows an alternate embodiment of the apparatus 10. The multiple channels 31A,31B,31C,31D shown are substantially identical. Each channel 31A,31B,31C,31D includes an amplifier 32A,32B,32C,32D, a bandpass filter 34A,34B,34C,34D, and a demodulator 36A,36B,36C,36D. Each channel receives signals from an associated accelerometer 12A,12B,12C,12D. preferably, each accelerometer 12A,12B,12C,12D senses vibrations emanating from a bank of cylinders in a multicylinder internal combustion engine 14. Each channel 31A,31B,31C,31D processes the signal transmitted from its respective accelerometer 12A,12B,12C,12D in the manner described in reference to FIG. 1. The channels process the transmitted signals to produce respective knock signals having a magnitude responsive to the magnitude of knock in at least one combustion chamber. The knock signals from each channel are summed in a summing amplifier 80. The summing amplifier 80 delivers a summed knock signal having a magnitude responsive to the sum of the four knock signals. The summed knock signal passes to the discrete level detector 38. The discrete level detector 38, the display 40, and the shutdown circuit 2 function as described above in reference to FIGS. 1, 3, and 4.

INDUSTRIAL APPLICABILITY

Internal combustion engines experience a phenomenon called knock. Knock is a noise which occurs due to improper ignition of fuel in a combustion chamber. Poor timing, fuel octane level, and unsatisfactory fuel mixture all cause improper ignition. At times knock may be severe enough to cause engine damage. The apparatus 10 functions in two important ways. Firstly, it detects discrete levels of knock and presents them on a display 40. Using this tool an engine can be calibrated to operate at a desired level of knock. Lean burn engines, becoming popular recently due to low emissions, tend to operate on the verge of knock for optimum performance. Secondly, the apparatus 10 detects discrete levels of knock and transmits this information to a shutdown circuit 42. The shutdown circuit 42 counts the number of knock signals exceeding preselected references. If the number of knock signals exceeding one of the preselected references exceeds a predetermined number within a preselected time, then the shutdown circuit 42 delivers an engine shutdown signal. Preferably a relay 44 for controlling fuel delivery to the engine 4 is responsive to the engine shutdown signal. Upon reception of the engine shutdown signal, fuel delivery to the engine halts and the engine stops, thus preventing possible damage to the engine due to knock.

Other aspects, objects, and advantages of this invention can be obtained from a study of the drawings, the disclosure, and the appended claims.

We claim:

1. A method of detecting the magnitude of knock in an internal combustion engine having at least one combustion chamber, comprising the steps of:
   transmitting a signal responsive to a cavity resonance frequency of said combustion chamber;

processing said transmitted signal to produce a knock signal having a magnitude responsive to the magnitude of knock in at least one combustion chamber;

comparing the magnitude of said knock signal to a first preselected reference;

comparing the magnitude of said knock signal to a second preselected reference;

delivering a level signal indicative of the magnitude of said knock signal in response to a portion of said knock signal exceeding at least one of said preselected references;

counting the number of portions of said knock signal exceeding said first preselected reference;

counting the number of portions of said knock signal exceeding said second preselected reference;

delivering an engine shutdown signal in response to a first predetermined number of portions of said knock signals exceeding the first preselected reference; and delivering an engine shutdown signal in response to a second predetermined number of portions of said knock signals exceeding the second preselected reference.

2. The method, as set forth in claim 1, further comprising the step of:

displaying a level of knock in response to aid level signal.

3. The method, as set forth in claim 2, wherein said step of displaying includes:

illuminating a selected portion of a display in response to the magnitude of said level signal 4. A method of detecting the magnitude of knock in an internal combustion engine having at least one combustion chamber, comprising the steps of:

transmitting a signal responsive to a cavity resonance frequency of said combustion chamber;

processing said transmitted signal to produce a knock signal having a magnitude responsive to the magnitude of knock in at least one combustion chamber;

counting the number of portions of said knock signal exceeding a first preselected reference;

counting the number of portions of said knock signal exceeding a second preselected reference;

delivering n engine shutdown signal in response to a first predetermined number of portions of said knock signals exceeding the first preselected reference; and delivering an engine shutdown signal in response to a second predetermined number of portions of said knock signals exceeding the second preselected reference.

5. The method set forth in claim 4, wherein said step of processing includes:

filtering said transmitted signal and delivering a filtered signal having a frequency within a range about said cavity resonance frequency.

6. The method, as set forth in claim 5, wherein said step of processing includes:

demodulating said filtered signal and delivering a knock signal responsive to the magnitude of knock.

7. The method set forth in claim 4, wherein:

said engine shutdown signal is delivered in response a first predetermined number of portions of said knock signal exceeding the first preselected reference in a first predetermined amount of time; and said engine shutdown signal is delivered in response to a second predetermined number of portions of said knock signal exceeding the second preselected reference in a second predetermined amount of time.

8. A method of delivering a shutdown signal in response to the magnitude and recurrence of knock in an internal combustion engine having at least one combustion chamber, comprising the steps of:

transmitting a signal responsive to a cavity resonance frequency of said combustion chamber;

processing said transmitted signal to produce a knock signal having a magnitude responsive to the magnitude of knock in at least one combustion chamber;

counting the number of portions of said knock signal whose magnitude exceeds a preselected reference; and delivering an engine shutdown signal in response to the counter number exceeding a preselected number in a predetermined amount of time.

9. An apparatus for delivering a shutdown signal in response to the magnitude and recurrence of knock in an internal combustion engine having at least one combustion chamber, comprising:

means for transmitting a signal responsive to a cavity resonance frequency of the combustion chamber;

means for receiving said transmitted signal and processing the same to produce a knock signal having magnitude responsive to the magnitude of knock in the combustion chamber;

means for counting the number of portions of the knock signal whose magnitude exceeds a preselected reference; and means for delivering an engine shutdown signal in response to the counted number exceeding a preselected number in a predetermined amount of time.

10. An apparatus for delivering a shutdown signal as set forth in claim 9, in which:

the counting means also counts a second number of portions of the knock signal exceeding a second preselected reference; and the last-mentioned means delivers an engine shutdown signal in response to the second counted number exceeding a second preselected number in the second predetermined amount of time.

11. An apparatus for delivering a shutdown signal as set forth in claim 10, wherein the means for receiving and processing includes:

means for filtering the transmitted signal and delivering a filtered signal having a frequency within a range about said cavity resonance frequency.

12. An apparatus for delivering a shutdown signal as set forth in claim 11, wherein the means for receiving and processing further includes:

a demodulator for demodulating said filtered signal and delivering a knock signal responsive to the magnitude of knock.

13. An apparatus for detecting the magnitude of knock in an internal combustion engine having at least one combustion chamber, comprising:

means for transmitting a signal responsive to a cavity resonance frequency of the combustion chamber;

means for receiving and processing said transmitted signal to produce a knock signal having a magnitude responsive to the magnitude of knock in the combustion chamber;

means for counting the number of portions of said knock signal exceeding a first preselected reference and for counting the number of portions of said knock signal exceeding a second preselected reference; and means for delivering an engine shutdown signal in response to a first predetermined number of portions of said knock signals exceeding the first preselected reference, and for delivering an engine shutdown signal in response to a second predetermined number of portions of said knock signals exceeding the second preselected reference.

* * * * *